United States Patent [19]

Fateley et al.

[11] Patent Number: 4,856,897
[45] Date of Patent: Aug. 15, 1989

[54] RAMAN SPECTROMETER HAVING HADAMARD ELECTROOPTICAL MASK AND DIODE DETECTOR

[75] Inventors: William G. Fateley, Manhattan, Kans.; David C. Tilotta, Des Moines, Iowa

[73] Assignee: D.O.M. Associates, Inc., Manhattan, Kans.

[21] Appl. No.: 85,530

[22] Filed: Aug. 14, 1987

[51] Int. Cl.$^4$ ............................................. G01N 21/65
[52] U.S. Cl. ................................... 356/301; 356/310; 356/333
[58] Field of Search ............... 356/301, 310, 330, 333, 356/318

[56] References Cited

U.S. PATENT DOCUMENTS

| | | | |
|---|---|---|---|
| 3,402,001 | 9/1968 | Fleisher | 350/150 |
| 3,484,722 | 12/1969 | Barker, Jr. et al. | 332/4 |
| 3,578,980 | 5/1971 | Decker, Jr. et al. | 250/237 |
| 3,813,142 | 5/1974 | Buhrer | 350/96 |
| 3,815,090 | 6/1974 | Muenchhausen | 340/146 |
| 3,859,515 | 1/1975 | Radcliffe, Jr. | 235/164 |
| 3,861,784 | 1/1975 | Torok | 350/162 |
| 3,969,699 | 7/1976 | McGlaughlin | 340/146 |
| 3,982,227 | 9/1976 | Joynson et al. | 340/146.3 |
| 4,007,989 | 2/1977 | Wajda | 356/96 |
| 4,134,134 | 1/1979 | Lux | 358/280 |
| 4,193,691 | 3/1980 | Fjarlie | 356/330 |
| 4,283,113 | 8/1981 | Eden | 350/96 |
| 4,389,673 | 6/1983 | Despois et al. | 358/160 |
| 4,421,985 | 12/1983 | Billingsley et al. | 250/353 |
| 4,615,619 | 10/1986 | Fateley | 356/330 |
| 4,662,747 | 5/1987 | Isaacson et al. | 356/317 |

FOREIGN PATENT DOCUMENTS

| | | | |
|---|---|---|---|
| 0075171 | 3/1983 | European Pat. Off. | 356/328 |
| 2197186 | 3/1974 | France . | |

OTHER PUBLICATIONS

Leipertz, "Nondestructive Probing of the Free Jets Using CW Laser Raman Spectroscopy", Optics & Laser Technology, Feb. 1981, pp. 21-25.
Fellman et al, "Premonochromator for Stray Light Rejection in Raman Spectroscopy", Applied Optics, vol. 16 #4, Apr. 1977, pp. 1085-1087.
The chapter entitled "Hadamard Transform Spectroscopy", by W. G. Fateley, et al., at pp. 89-118, of the book Analytical Applications of FT-IR to Molecular and Biological Systems, edited by J. R. Durig, and published by D. Reidel Publ. Co., in 1980.
The book "Hadamard Transform Optics", by Martin Harwit, et al., published by Academic Press, Inc., in 1979, pp. 185-187.
The chapter entitled "Hadamard Transform Analytical Systems", by Martin Harwit, at pp. 173-197, of the book Transform Techniques in Chemistry, edited by P. R. Griffiths and published by Plenum Press, in 1978.
The article entitled "Fourier and Hadamard Transform Methods in Spectroscopy", by A. G. Marshall et al., at pp. 491A-504A, of the journal Analytical Chemistry, vol. 47, No. 4, Apr. 1975.

(List continued on next page.)

Primary Examiner—Vincent P. McGraw
Attorney, Agent, or Firm—Hovey, Williams, Timmons & Collins

[57] ABSTRACT

An improved Raman spectrometer device is provided which provides useful spectral information in situations where Raman spectroscopy has heretofore been unworkable. The spectrometer of the invention makes use of a stationary electrooptical masking device in lieu of conventional slit scanning optics, with the mask being computer controlled to provide a multiplexing function, typically employing Hadamard mathematics. The stationary encoding mask permits use of a relatively inexpensive photodiode detector, as compared with photomultiplier tubes conventionally used in Raman instrumentation. Advantageously, unwanted Rayleigh scattered radiation can be completely eliminated, either by blanking those zones of the mask receiving such radiation, or physically locating the device in such orientation that the Rayleigh scattered radiation does not pass through operative portions of the mask.

19 Claims, 7 Drawing Sheets

OTHER PUBLICATIONS

The article entitled "Hadamard-Transform Image Scanning", by J. A. Decker, Jr., at pp. 1392–1395, of the journal Applied Optics, vol. 9, No. 6, Jun. 1970, pp. 1392–1395.

The article entitled "Hadamard Transform Image Coding", by W. K. Pratt, et al., at pp. 58–68, of the journal Proceedings of the IEEE, vol. 57, No. 1, Jan. 1969.

The article entitled "Measurements of Spontaneous Raman Scattering with Nd:YAG 1064-nm Laser Light" by M. Fujiwara et al., Applied Spectroscopy, vol. 40. No. 2, 1986, pp. 137–139.

The article entitled "FT-Raman Spectroscopy: Development and Justification", by T. Hirschfeld et al., from Applied Spectroscopy, vol. 40, No. 2, 1986, pp. 133–136.

The article "Fourier Transform Raman Spectroscopy", by D. Bruce Chase, journal American Chemical Society, 1986.

The article entitled "Fourier Transform Raman Spectroscopy: Scattering in the Near-Infrared", by Hallmark et al., from Spectroscopy, vol. 2, No. 6, pp. 40–47.

Willard, Merritt, Jr. and Dean, Instrumental Methods of Analysis, Chapter 8 entitled "Raman Spectroscopy".

The article entitled "Interferometric Observation of Raman Spectra: Comparison of Photomultiplier and Avalanche Diode Detectors", by D. J. Moffatt et al., Applied Spectroscopy, vol. 40, No. 8, 1986, pp. 1079–1081.

The article entitled "Instrumentation", by Bruce Chase, Analytical Chemistry, vol. 59, No. 14, Jul. 15, 1987, pp. 881A–889A.

The article entitled "Fourier Transform Raman Spectroscopy Long-Chain Molecules Containing Strongly Absorbing Chromophores", by C. G. Zimba et al., Applied Spectroscopy, vol. 41, No. 5, 1987, pp. 721–726.

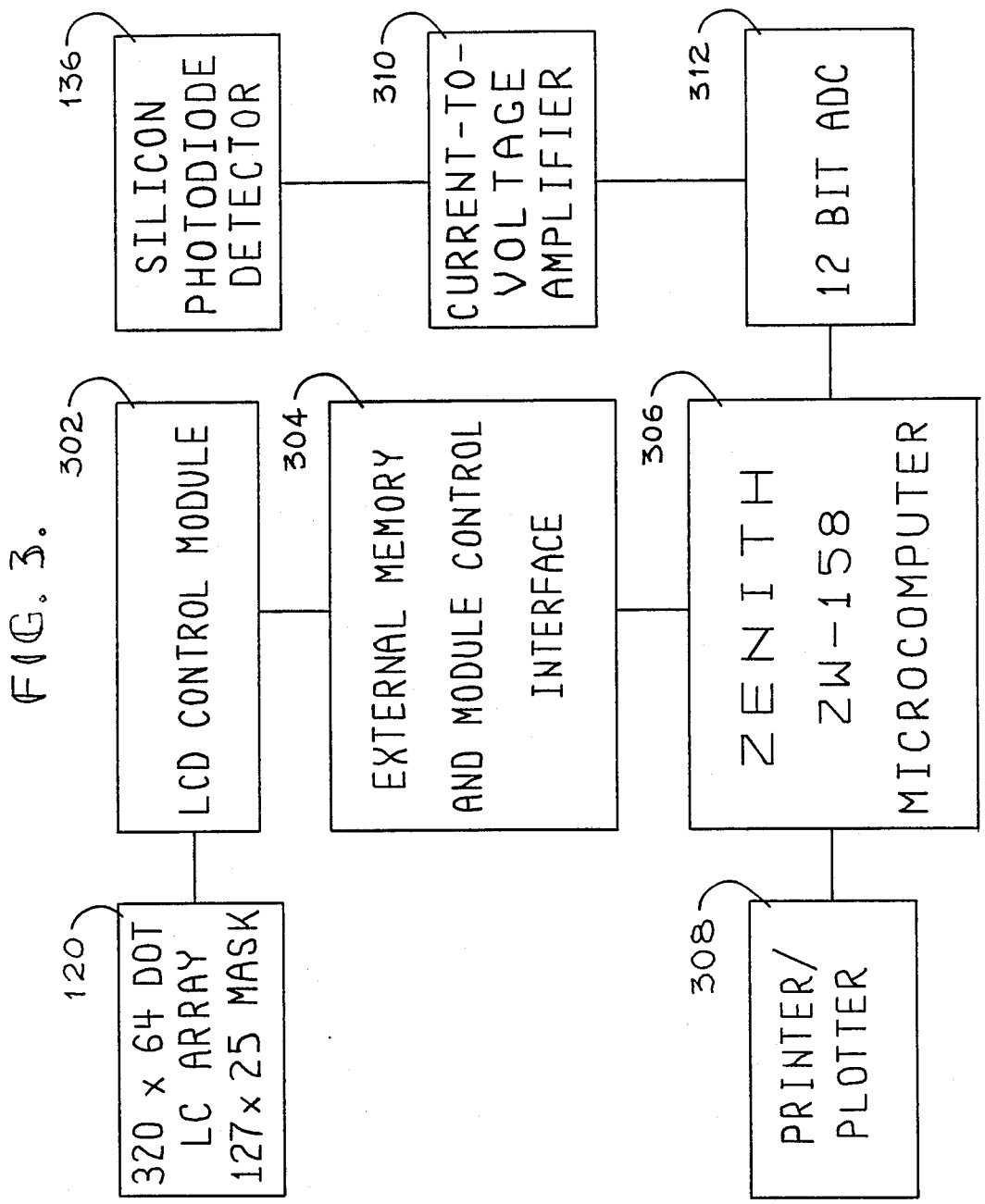

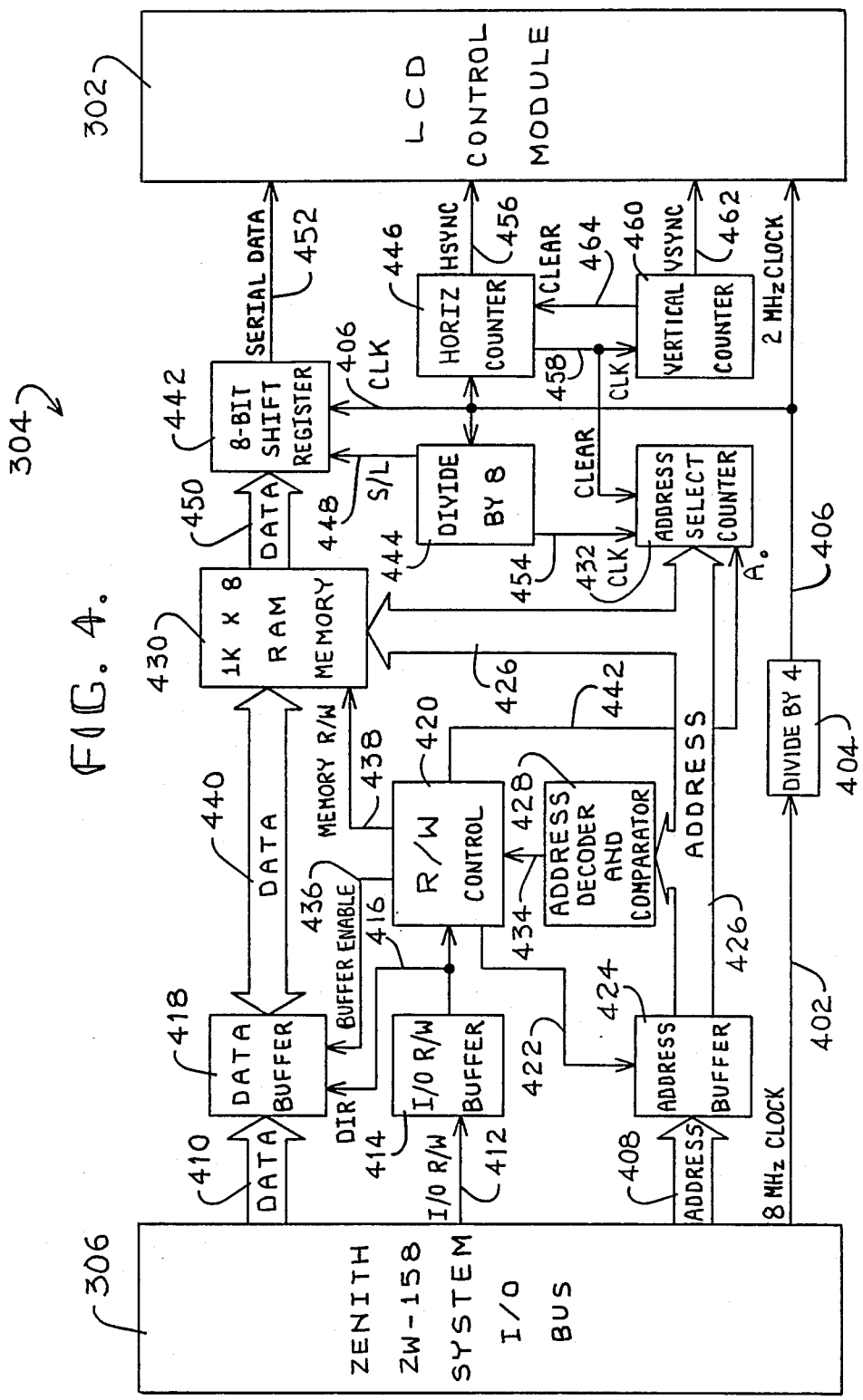

RAMAN SPECTROMETER HAVING HADAMARD ELECTROOPTICAL MASK AND DIODE DETECTOR

BACKGROUND OF THE INVENTION

1. Field of the Invention

This invention relates to Raman spectrometers characterized by extremely favorable signal to noise ratios and the ability to obtain usable spectral data in situations where Raman spectroscopy has heretofore proved to be unworkable. More particularly, it is concerned with such Raman spectral instrumentation making use of a stationary electrooptical mask in lieu of conventional slit scanning hardware, together with appropriate computer-controlled electronics permitting use of Hadamard multiplexing techniques.

2. Description of the Prior Art

Raman spectroscopy was discovered in 1928 and has been an important method for the elucidation of molecular structure, for locating various functional groups or chemical bonds in molecules, and for the quantitative analysis of complex mixtures, particularly for major components. Although Raman spectra are related to infrared absorption spectra, a Raman spectrum arises in a quite different manner and thus provides complementary information.

When monochromatic light is scattered by molecules, a small fraction of the scattered light is observed to have a different frequency from that of the irradiating light; this is known as the Raman effect. Raman spectroscopy is in turn based upon the Raman effect, and involves the passage of monochromatic light into a sample that contains molecules which can undergo a change in molecular polarizability as they vibrate. It is strictly a quantum effect. Most collisions of the incident photons of the irradiating monochromatic light with the sample molecules are elastic, resulting in so-called Rayleigh scattering. In such Rayleigh scattering, the electric field produced by the polarized molecule oscillates at the same frequency as the incident electromagnetic wave, so that the molecule acts as a source sending out radiation of that frequency. The incident radiation does not raise the molecule to any particular quantized level, and accordingly the molecule can be considered as in a virtual excited state. As the electromagnetic wave passes, the polarized molecule ceases to oscillate and returns to its original ground level in a very short time (approximately $10^{-12}$ seconds).

A small proportion of the excited molecules of the sample ($10^{-6}$ or less) may undergo a change in polarizability during one of the normal vibrational modes. This provides the basis for the Raman effect. Usually incident radiation, $V_O$, is absorbed by a molecule in the lowest vibrational state. If that molecule while in the virtual state, re-emits by returning not to the original vibrational state, but to an excited vibrational level, $V_v$, of the ground electronic state, the emitted radiation is of lower energy, or lower frequency than the incident radiation. The difference in frequency is equal to a natural vibration frequency of the molecule's ground electronic state. Several such shifted lines (Stoke lines) normally will be observed in a Raman spectrum, corresponding to different vibrations in the molecule. This provides a richly detailed vibrational spectrum of the molecule.

A few of the molecules initially will absorb radiation while they are in an excited vibrational state and will decay to a lower energy level, so that their Raman scattered light will have a higher frequency than the incident radiation. These are called anti-Stokes lines. Thus the spectrum of the scattered light consists of a relatively strong component with frequency unshifted (Rayleight scattering), corresponding to photons scattered without energy exchange, and the two components of the Raman spectrum, namely the Stokes and anti-Stokes lines. Normally, for chemical analysis, only the Stokes lines are considered, because of their greater intensity.

In the usual Raman technique, the excitation frequency of the source radiation is selected to lie below most S-S* electronic transitions and above most fundamental vibration frequencies, although this is not always the case, such as in resonance Raman spectroscopy.

Raman spectroscopy offers several advantages over conventional IR absorption measurements. First, Raman spectroscopy can be used to detect and analyze molecules with infrared inactive spectra, such as homonuclear diatomic molecules. For complicated molecules whose low symmetry does not forbid both Raman and infrared activity, certain vibrational modes are inherently stronger in the Raman effect and weaker in, or apparently absent from, the infrared spectrum. Raman activity tends to be a function of the covalent character of bonds and the molecular polarizability of the molecule. Hence, a Raman spectrum reveals information regarding the structure of the molecule.

Raman spectra can be used to study materials in aqueous solutions, a medium that transmits infrared radiation very poorly. Finally, sample preparation for Raman is normally simpler than for IR absorption.

While Raman spectroscopy does therefore exhibit decided advantages, certain heretofore intractable problems have detracted from the usefulness of the technique. The primary disadvantage is the fluorescent background that is generated upon intense laser radiation of many samples. Relative to the Raman signal, the fluorescent background can be enormous, completely obliterating the spectrum. Even if the Raman spectrum could be observed superimposed on the fluorescent background, the noise contribution of the fluorescent emission degrades the signal to noise ratio of the Raman spectrum.

Most conventional Raman instruments make use of an expensive photomultiplier tube (PMT) as a detector. The PMT is normally required because of the very weak Raman signal, and prior attempts at using inexpensive detectors such as room temperature silicon diodes in conventional dispersive instruments have resulted in unacceptable signal to noise ratios, again to the point of obliterating the spectrum. Thus, the cost of Raman instrumentation can be considerable.

It has previously been demonstrated that the use of a red ($Kr^+$) or near-infrared (Nd:YAG) exciting laser in Raman spectrometry avoids the problems of sample fluorescence and sample photodecomposition common to blue-green ($Ar^+$) or higher energy laser Raman spectrometry. However, use of these relative low-energy lasers results in a decrease in the intensity of the Raman scattered radiation. Thus, it was found necessary to employ a Fourier transform multiplex spectrometer in an attempt to recover the loss in the signal to noise ratio due to the weaker Raman scattered radiation. When a Fourier transform spectrometer is used for Raman spectroscopy, however, the multiplex nature of the Fourier transform instrument leads to several problems stemming from the relatively weak intensity of the Raman scattered radiation, and the comparatively strong intensity of the Rayleigh scattered radiation. As a consequence, special efforts have been made in such systems to remove the Rayleight radiation. Such prior efforts involved the use of optical pass filters to remove the Rayleigh line before the radiation was admitted into the instrument. The use of optical pass filters, however, has the disadvantage of significantly decreasing the frequency range of the Raman scattered radiation that may be observed. Moreover, the overall intensity of the Raman scattered radiation is lowered as well.

As noted above, use of Fourier transform spectroscopy in Raman spectral analysis is hampered by the large disparity between the intensities of the Raman radiation and the Rayleigh radiation. These two characteristics of the Raman technique translate into at least two considerations which must be treated in the design of any Raman multiplex instrument (i.e., one where the simultaneous measurement of more than one resolution element of radiation at a time where a resolution element is defines as a short wavenumber interval of radiation).

One consequence of the comparatively strong Rayleigh radiation is that when a multiplex method of data acquisition is used, any noise associated with the Rayleigh line will be distributed throughout the entire spectrum. Since the intensity of the Rayleigh radiation is at least three orders of magnitude greater than the intensity of the Raman radiation, the signal to noise ratio for the entire spectrum will be significantly degraded. Thus, if the Rayleigh line is not removed, the weaker Raman scattering may be partially obscured or completely obliterated.

A second consideration in the design of a multiplexed Raman instrument is the larger dynamic range of the signal on the detection system (a factory of approximately $10^3$) due to the difference between the Rayleigh scattered radiation intensity and the Raman scattered radiation intensity. Even assuming that the Rayleigh scattered radiation is noise-free, the detection system of the multiplexing instrument must be capable of discriminating between small changes in the multiplex coding of the radiation intensity.

Thus, while the ability of multiplexing techniques to improve the signal to noise ratio of conventional dispersive spectrometers is understood, conventional multiplex Fourier transform spectrometers present serious difficulties when used in the context of Raman spectroscopy, because of the inability to properly eliminate the Rayleigh line from the spectrum without a concomitant serious degradation of the resultant analytical results.

Another multiplexing technique heretofore developed is known as Hadamard transform spectrometry. The theory of Hadamard data encodement and its application to the field of optical spectrometry has been described by Harwit, et al., *Hadamard Transform Optics*, Academic Press, New York, 1979. Hadamard transform spectrometers are multi-slit coding devices that select unique combinations of resolution elements of radiation via an encoding mask placed in the exit focal plane of a conventional dispersive spectrometer. The radiation allowed to pass through the encoding mask is collected, dedispersed, and detected with conventional detectors. The selection of resolution elements allowed to pass through the mask is governed by the weighing designs given by Hadamard metrices. It is through the encoding mask that Hadamard transform spectrometry derives its multiplexing capabilities. Typically, a Hadamard mask is computer-controlled, with the appropriate Hadamard mathematics being applied as software in the computer.

Typical encodement masks forming a part of Hadamard devices are multiple-slit, mechanically movable bodies which are periodically exchanged or shifted during a spectral analysis. As a consequence of this design, the resulting spectra are inevitably degraded, inasmuch as it is virtually impossible to control the movement and positioning of mechanical mask with the degree of accuracy commensurate with that of the remainder of the instrument. In short, conventional mechanical masks are very expensive and difficult to properly operate.

Further details pertaining to Raman spectroscopy, multiplexing techniques and Hadamard spectroscopy can be found in the aforementioned Harwit, et al. publication and in the following: *Instrumental Methods of Analysis*, H. H. Willard, et al., Chapter 8, pp. 217–238; and in U.S. Pat. No. 4,615,619 and the references cited therein. These publications and U.S. Pat. No. 4,615,619 are incorporated by reference herein. The aforementioned patent specifically discloses an improved electrooptical masking device designed to be positioned in a stationary fashion in a dispersive spectrometer to facilitate Hadamarad encodement techniques.

SUMMARY OF THE INVENTION

The present invention overcomes the problems noted above and provides a greatly improved Raman spectrometer device which is characterized by an extremely favorable signal to noise ratio permitting use of the spectrometer in connection with analyses which could heretofore not be performed using a Raman instrument.

Broadly speaking, a spectrophotometer in accordance with the invention includes a source of monochromatic radiation located for sending a beam thereof into a sample to be analyzed, together with means for sampling radiation emanating from the sample. The source of radiation is preferably a laser, and should be operable for generating monochromatic radiation having a wave length of from about 0.1 to 2.0 microns. The sampling means is in the form of a stationary electrooptical masking device comprising a body presenting a pair of opposed faces, zone-defining means carried by the body and dividing at least one face of the body into a plurality of discrete, electrically alterable zones. Means coupled with the zone-defining structure is provided for selective alteration of each zone respectively between a condition where it is relatively transmissive for the emanating radiation, to a condition where it is relatively opaque for the emanating radiation.

In particularly preferred embodiments of the invention, the masking device is in the form of a liquid crystal array. In such form, the device comprises an enclosed body having a pair of opposed, transparent plates with liquid crystal material between the plates. Electrode means are carried by the plates for dividing at least one plate into a series of respective, electrically separate zones. Conductor means are operably coupled with the electrode means for permitting application of an electrical potential across selected ones of electrodes making up the zones. In this fashion, the device is operable such that each of the zones is individually alterable between a relatively transmissive and relatively opaque condition for the radiation emanating from a sample.

The overall Raman instrument further includes a detector situated to receive radiation after passing through the masking device. Advantageously, the detector is in the form of a photodiode such as a silicon diode. Such an inexpensive detector can be used in the Raman instrument of the invention because of the presence of the encoding mask, while still maintaining an acceptable signal to noise ratio. Of course, other known detectors such as PMT's, thermal detectors, quantum detectors, and pyroelectric detectors may also be used.

One particularly advantageous feature of the present invnetion stems from the selective multiplexing obtainable through the use of a stationary electrooptical mask. As noted, a prime deficiency in prior multiplexing techniques used in the context of Raman spectroscopy results from the presence of the Rayleigh line. In the present invention, however, the mask may be operated in such manner as to maintain that portion of the mask receiving the Rayleigh line in an opaque condition, or more simply to selectively position the mask so that the Rayleigh line does not impinge upon operative portions of the mask at all. In either event, the problem of intense Rayleigh scattered radiation is resolved in the Raman instrumentation of the present invention.

The encodement mask of the invention is controlled by an appropriately programmed electronic computer. Such computer hardware and software, and the algorithmic and computational aspects of employing Hadamard transform techniques are as described above known in the art, and these are not per se claimed herein.

BRIEF DESCRIPTION OF THE DRAWINGS

FIG. 3 is a block diagram depicting the electronic interconnection of the various control and output components of the spectrometer;

FIG. 4 is a detailed block diagram depicting the components and operation of the external memory and module control interface interconnecting the microcomputer and liquid crystal display control module;

DESCRIPTION OF THE PREFERRED EMBODIMENT

1. General Description of Raman Instrument

Figure 1:
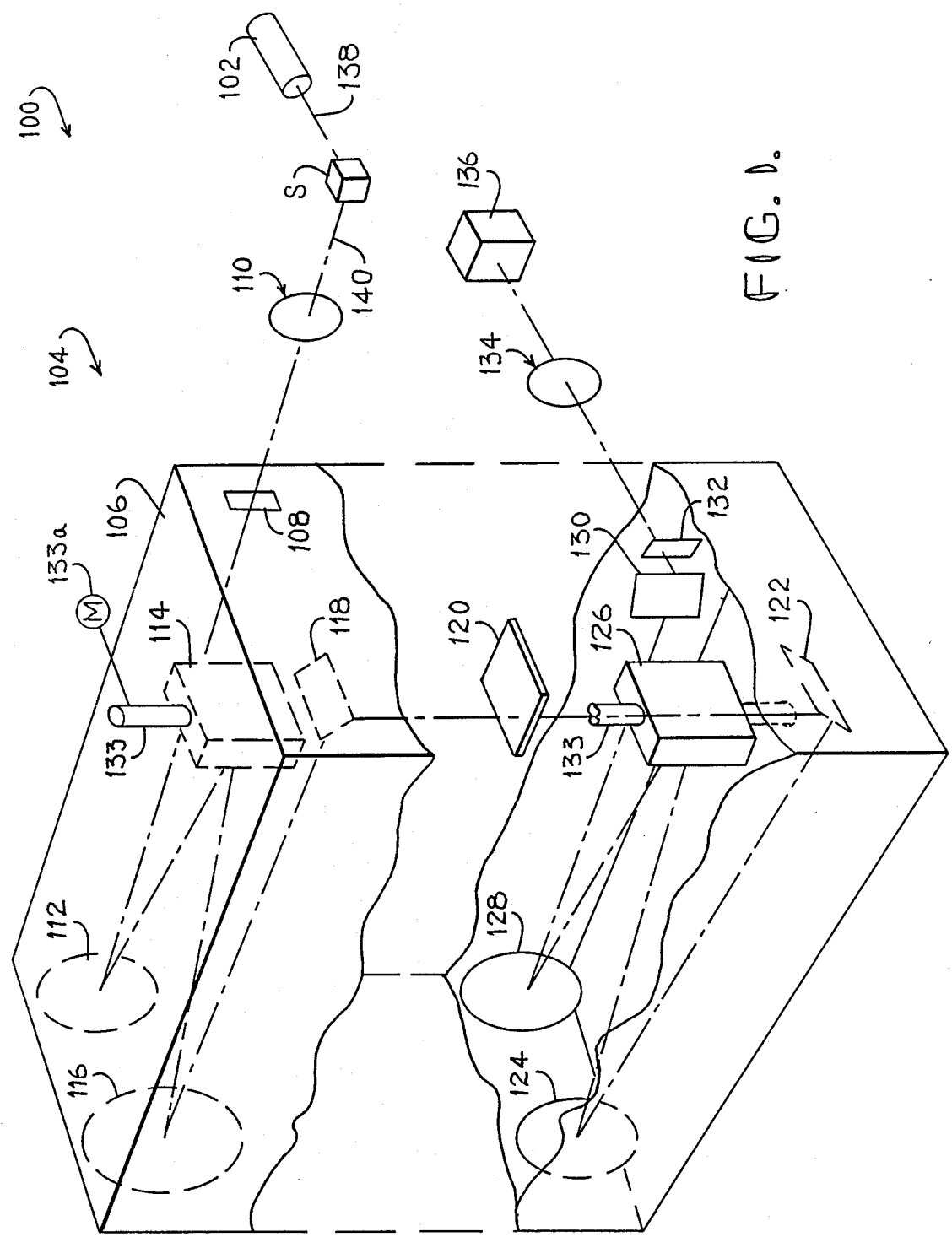
FIG. 1 is a schematic, perspective view of the preferred Raman spectrophotometer of the present invention.

Turning now to the drawings, a spectrometer 100 in accordance with the invention is schematically depicted in FIG. 1. The device 100 includes a source of monochromatic radiation, in this case a laser 102, together with a spectrometer broadly referred to by the numeral 104.

The laser 102 is a conventional Argon ion laser emitting blue-green visible monochromatic radiation having a wavelength of 0.5145 microns. The laser is commercially available from Spectra Physics Corp., Mountainview, Calif. Other lasers could also be used, either continuous wave or pulsed with appropriate gating.

Spectrometer 104 is a modified Jarrell-Ash Model 25-100 double Czerny-Turner scanning spectrometer obtained from Allied Analytical of Waltham, Mass. The optical and mechanical specifications for this device are given in the Table below. Two 102 mm × 102 mm, 1180 grooves/mm gratings blazed for 500 nm in the first order are employed. The polychromator is of an assymetric design to minimize comatic aberrations and, since this polychromator is convertible into a spectrograph, field curvature has been minimized.

In more detail, the spectrometer 104 includes an outer housing 106 provided with an entrance slit 108 and external optics schematically illustrated by lens assembly 110. Inside housing 106, the spectrometer includes a concave collimating mirror 112, plane grating 114 and concave camera (focusing) mirror 116. In addition, the internals include planar mirror 118, Hadamard encoding mask 120 and lower planar mirror 122. The apparatus also has a lower collimating mirror 124, dedispersion plane grating 126, concave focusing mirror 128, planar mirror 130 and exit slit 132. A common, axially rotatable mounting shaft 133 is provided for the gratings 114, 126 in order to selectively adjust the same; the shaft 133 is rotatable through a stepper motor 133a operatively coupled thereto. A focusing lens assembly schematically depicted at 134 is provided externally of housing 106 adjacent slit 132, along with detector 136 in the form of a silicon diode.

As is conventional with Raman instrumentation, a sample S is situated in the path 138 of monochromatic radiation from laser 102, and scattered radiation emanating from the sample is collected at a 90° angle to the path 138. Thus, as shown in FIG. 1, the scattered radiation emanating from sample S travels via path 140 through focusing lens 110 which serves to focus the light onto entrance slit 108 and mirror 112. The latter collimates the radiation onto the plane of grating 114. The dispersed radiation from grating 114 is then collected and focused onto encoding mask 120 through the use of mirrors 116, 118. Radiation transmitted through the encoding mask 120 is deflected by mirror 122 onto concave collimating mirror 124. Mirror 124 directs the dispersed radiation onto the plane of grating 126 for dedispersion. After being dedispersed, mirror 128 collects the pseudo-white light and directs it toward exit slit 132 and focusing lens assembly 134. The radiation is then detected by diode detector 136.

As indicated, the spectrometer 104 is a modified Czerny-Turner spectrometer. In particular, the commercial device was modified for the reception of mask 120 by the removal of the intermediate slit assembly normally provided, and replacement of the original equipment mirrors corresponding to those shown at 118 and 122 in FIG. 1 with larger mirrors. Further, the lower monochromator section was realigned to dedisperse the radiation after passage through mask 120, rather than doubly dispersing the radiation as originally intended.

As explained hereinafter, mask 120 is of liquid crystal design, i.e., it is a two-dimensional twisted nematic liquid crystal display module modified for use as an encoding mask. Furthermore, the mask 120 is appropriately coupled to a driving computer, the latter also being operatively connected to detector 136. The strucutre and operation of the mask 120 and associated electronics are fully described in subsequent sections hereof.

TABLE
Major Components of the Hadamard Transform Spectrometer

| Component | Description | Source |
| --- | --- | --- |
| Encoding Mask | Modified Two-Dimensional LC-SLM, 127 resolution elements, 600 um width/res. element | AND Corporation Burlingame, CA Model 12A |
| Polarizer | NIR enhanced dichroic sheet | Rolyn Optics Covina, CA Model 65.5305 |
| Spectrometer | | |
| Focal Length | 1 meter | |
| f/# | 8.7 | |
| Gratings | 102 × 102 mm, 1180 g/mm, blazed for 500 nm in the 1st order. | |
| Slits | Curved and bi-laterally adjustable, 5 nm-300 onm height adjustable from 1 mm-20 mm | |
| Reciprocal linear dispersion | .82 nm/mm in the 1st order at the mask focal plane | |
| External Optics | | Ealing Optics S. Natick, MA |
| Source Imaging | Biconvex glass lens, f = 10 cm, f/# = 2 | Model 20-9038 |
| Detector Imaging | Biconvex glass lens, f = 50 cm, f/# = 1 | Model 23-8907 |
| Detector | Si photodiode 1.1 nm × 5.9 nm 190 rm-1150 rm | Hamamatsu Middlesex, NJ Model S1337-16BQ |
| Microcomputer | Mask control and data acquisition (see text) | Zenith St. Joseph, MI Model ZW-158 |
| Analog-to-digital converter | 12 bit | Metrabyte Corp. Taunton, MA Model DASH-8 |

2. The Preferred Liquid Crystal Encoding Mask

Figure 2A:
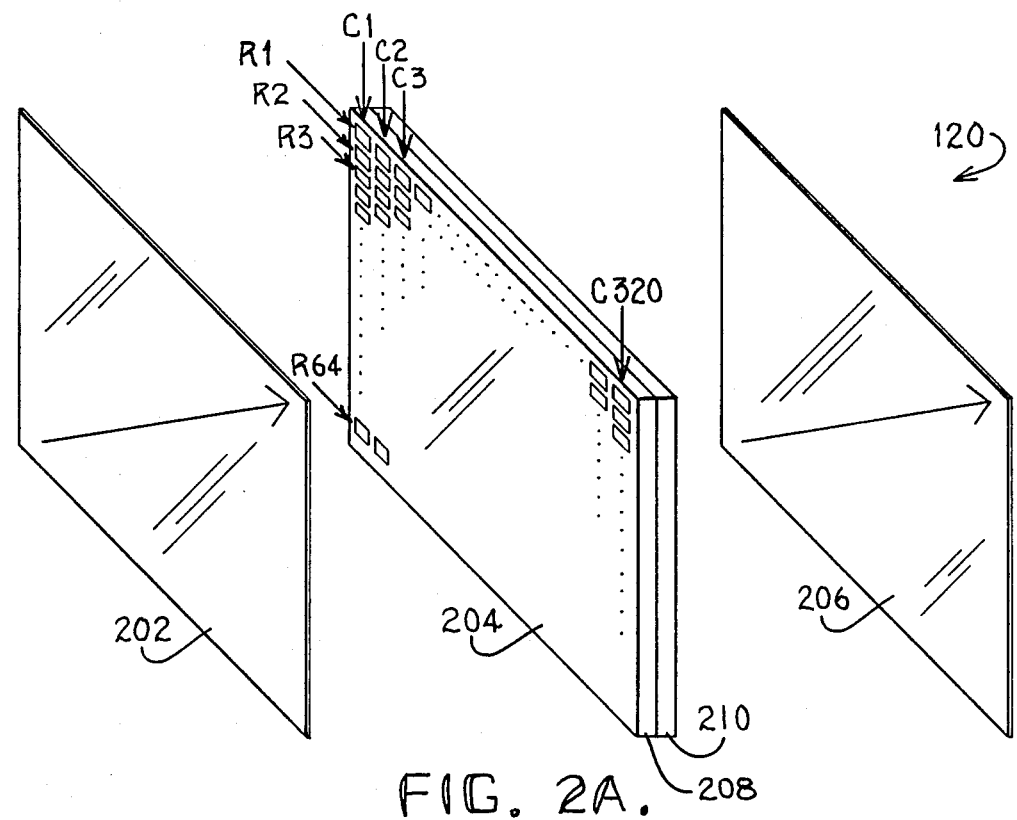
FIG. 2a is a schematic exploded view of the preferred liquid crystal masking device used in the spectrometer of the invention.

FIG. 2a schematically represents preferred encoding mask 120 which was produced by modifying liquid crystal display model AND012A manufactured by AND Corporation of Burlingame, Calif. The Model 12A mask is a two-dimensional twisted nematic liquid crystal display module having 20,480 pixels arranged in a 320×64 rectangular pixel array and having an overall dimension of 228 mm in length by 57 mm in height. Each pixel measures 600 microns by 720 microns with the 600 micron dimension being oriented parallel to the 228 millimeter dimension of the display. The spacing between cells is 100 microns.

The original display, as received, was designed to function as two-dimensional display unit in a reflectance configuration and came complete with liquid crystal cell electronic drivers mounted on circuit boards folded in a "sandwich" directly behind the liquid crystal display. The electronic controllers were connected to the liquid crystal display through edge-connecting ribbon cables. In adapting the liquid crystal display for use as a Hadamard encoding mask, modifications were required to both the optical and electronic components.

First, the module was disassembled to unfold the electronic circuit boards from the liquid crystal display. This allowed direct access to the display array. An aluminum mirror used to reflect the light back through the array was removed and the attaching adhesive abraded. The rear polarizer sheet supplied with the array was replaced with a preferred sheet manufactured by Rolyn Optics Company of Covina, Calif. Model 65.5305 which possesses better near-infrared polarizing properties. When the rear polarizer was replaced, the polarization angle was rotated 90° to that of the polarizer originally supplied.

FIG. 2 schematically illustrates an exploded view of the preferred modified encoding mask. Mask 120 includes front polarizer 202, liquid crystal unit 204, and rear polarizer 206. Liquid crystal unit 204 is composed of a "sandwich" of two transparent plates 208 and 210 having liquid crystal material disposed therebetween and with the edge around sheets 208, 210 sealed. Transparent electrodes coat the inner surfaces of sheets 208, 210 to present the desired pattern of liquid crystal segments, in this case an array of rectangular segments arranged in the pattern of 320×64. The arrangement of the liquid crystal segments presents 320 columns, Cl-320, and 64 rows R1-64. Light entering through front polarizer 202 is polarized along the direction indicated by the arrow and then passes through the crystals of unit 204 which when deenergized, twist the beam 90° so that the beam emerges polarized perpendicular to the polarization of rear polarizer 206. Thus, a light beam passing through de-energized liquid crystals is blocked from passing through rear polarized 206 because the beam is polarized perpendicular thereto.

If a pixel is energized, however, light passing therethrough from front polarizer 202 is not twisted and emerges from liquid crystal unit 204 parallel to the polarization of rear polarizer 206 and passes therethrough. Light passing in the spaces between individual pixels passes through de-energized liquid crystals because no electrodes are associated therewith and this light is thus polarized perpendicular to rear polarizer 206 and is blocked. Thus, the structure of preferred encoding mask 120, only allows light passing through energized pixels to emerge.

Figure 2B:
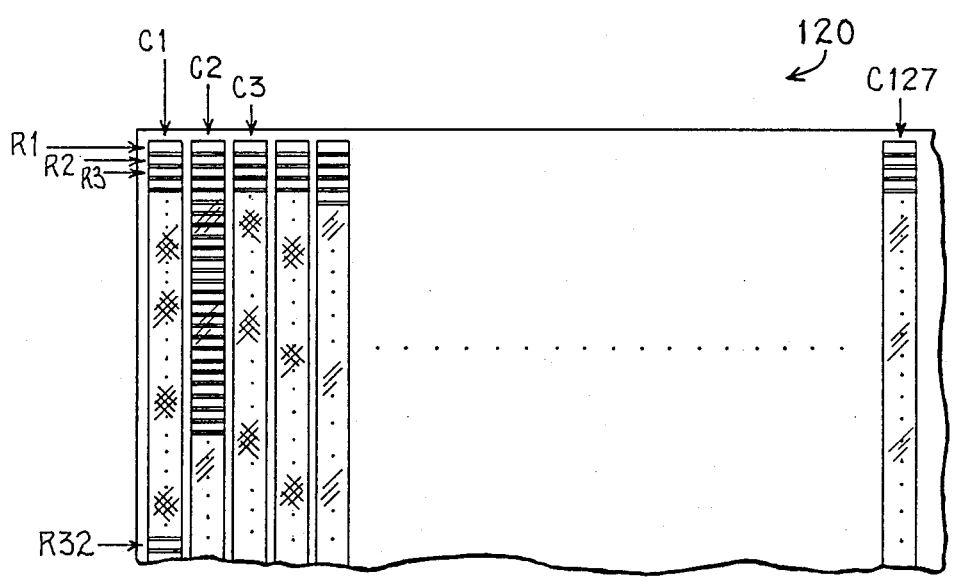
FIG. 2b is a schematic elevational view illustrating the operation of the preferred liquid crystal mask with certain zones of the mask being transmissive for impinging radiation, and other of such zones being opaque for such radiation.

FIG. 2b schematically illustrates preferred encoding mask 120 arranged in a masking pattern, with certain of the pixels energized and relatively transmissive and others de-energized and relatively opaque, to form columnar zones with all of the rows in a given column being all relatively transmissive or opaque. The preferred pattern on mask 120 resembles a "bar code" and uses only 127 of the 320 columns provided by the mask. Hadamard mathematics dictates that a given mask having 127 masking zones be operated through 127 different patterns (because of 127 columns used) with 64 of the columns (or zones) being transmissive for any given one of the 127 different patterns. Accordingly, encoding mask 120 is operated to produce a sequential series of 127 columnar patterns as schematically illustrated in FIG. 2b. The electrical hardware associated with mask 120 in not shown in FIGS. 2A and 2B.

3. Electronic Control

FIG. 3 illustrates an overall schematic block diagram of the associated electronic components of spectrometer 104. The components illustrated include preferred encoding mask 120, LCD control module 302 supplied with the liquid crystal display as purchased, external memory and module control interface 304 (FIG. 4), microcomputer 306 (preferably Zenith Model ZW-158), printer-plotter 308, silicon photodiode detector 136, current-to-voltage converter/amplifier 310, and 12 bit, analog-to-digital converter (ADC) 312.

Current-to-voltage converter/amplifier combination 310 is preferably a DC-coupled 1 gigavolt/amp. gain converter (Analog Modules, Inc., Longwood, Fla., Model No. 341-1), coupled to two series-connected four-step, 18dB, gain-switched amplifiers (Analog Modules, Inc., Model No. 332-1). In addition, a passive low-pass electronic filter (Rockland Systems, Inc., Model No. 442) is connected to the output of the amplifier combination. The gain stage immediately followed the current-to-voltage converter also serves as a variable voltage offset to remove the direct current background. This voltage offset allows the modulated signal to utilize the entire analog-to-digital converter voltage range.

ADC 312 is preferably a Model DASH-8 supplied by Metrabyte Corporation of Taunton, Mass.

FIG. 4 illustrates interface 304 which is coupled between microcomputer 306 and control module 302 to provide mask pattern serial data to module 302 at a much faster rate than the software contained in microcomputer 306 can provide and to provide other control inputs to module 302 described hereinbelow.

The input-output (I/O) bus of microcomputer 306 provides an 8 megahertz clock signal via line 402 to conventional divide-by-four module 404 which in turn provides an output clock signal at 2 megahertz on line 406. Microcomputer 306 also provides an 8-bit address output via address bus 408, an 8-bit data output via data bus 410, and an I/O read write output via line 412.

The mask patterns to be imposed on mask 120 are formatted in forty 8-bit bytes for a total of 320 bits corresponding to the 320 columns of the LCD array. Even though only 127 columns are used, it is still necessary to provide output to the unused columns, such that these unused columns are blanked to prevent any light from passing therethrough. Those skilled in the art will appreciate that a custom LCD display with only 127 columns could be manufactured using custom electronic components adapted to operate those 127 columns. In the preferred embodiment, however, the LCD mask and electronic components are preferred because they are "off the shelf" and readily available and provide the capability of other patterns based on a different number of columns.

In the operation of interface 304, it is first necessary to load the 320 bits of data (40 bytes) for a given one of the 127 masking patterns from the system software. When the system is ready to output data, I/O line 412 is activated to place I/O buffer 414 in a write mode. Buffer 412 then transmits a signal via line 416 to data buffer 418 and read-write (R/W) control 420. The signal on line 416 to data buffer 418 sets the direction of data transfer outwardly from microcomputer 306. The signal on line 416 also causes R/W control 420 to output an address buffer enable signal via line 422 to address buffer 424.

After address buffer 424 is enabled, the output address from microcomputer 306 is imposed on second address bus 426 for transmission to address decoder and comparator 428, random access memory (RAM) 430, and address select counter 432. Address decoder 428 is configured to produce an output signal via line 434 during each of the 40 addresses corresponding to the 40 bytes of data to transferred from microcomputer 306. The address on bus 426 also selects the appropriate memory location in 430 for storage of the data byte associated with that particular address.

With line 434 active, R/W control 420 produces a data buffer enable signal via line 436 to data buffer 418, and a write signal via line 438 to place RAM 430 in a write mode. Data is transferred via second data bus 440 to RAM 430 which places the data byte in the memory location determined by the address present on address bus 426. R/W control 420 also sends a disable signal via line 442 to disable address counter 432 whenever computer 306 is writing data to RAM 430.

The software of microcomputer 306 sequentially outputs 40 bytes of data and 40 corresponding addresses to RAM 430 to load a total of 320 bits of data corresponding to the desired columnar pattern on mask 120.

When the data output is complete, computer 306 outputs a read signal on line 412 to buffer 414. Buffer 414 then outputs a read signal via line 416 to data buffer 418 and R/W control 420. R/W control 420 then disables address buffer 424 via line 422, disables data buffer 418 via line 436, places RAM 430 in the read mode via line 438, and enables address select counter 432 via line 442. After the mask pattern data is stored in RAM 430 and with address select counter 432 enabled, the balance of the components of interface 304 serve to serially output the mask pattern to module 302.

As discussed above, line 406 provides 2 megahertz clock pulses which are delivered to 8-bit shift register 442, divide-by-8 device 444, horizontal counter 446, and LCD control module 302.

After address select counter 432 is enabled via line 442, it presents an address on bus 426 to RAM 430 which corresponds to the address of the first byte of mask pattern data. Device 444 then outputs a shift load signal via line 448 to register 442 after eight clock pulses, which causes register 442 to load the data byte via data bus 450 from RAM 430 corresponding to the address present on address bus 426. The clock pulses on line 406 to register 442 cause one bit of serial data to shift out from register 442 to module 302 with each clock pulse.

After another eight clock pulses, device 444 produces an output via line 454 to the clock input terminal of address select counter 432 which causes it to increment to the next address corresponding to the second byte of data present in RAM 430. The corresponding data is presented on bus 450 and the si gnal on line 448 also occuring after eight pulses of input to device 444, causes register 442 to load the second byte of data which is then serially transmitted to LCD control module 302 via line 452. This process continues until all 40 bytes of data in RAM 430 have been serially transmitted to LCD control module 302.

Upon completion of transmission of the fortieth byte which corresponds to 320 clock-pulses, the horizontal synchronization signal (HSYNC) via line 456 to LCD control module 302 goes low for one clock pulse which advances the LCD control module to the next row in the array. However, in the use of the preferred mask, all the rows are tied together in order to produce a columnar mask pattern and upon the next input of 40 bytes, all rows in a given column are simultaneously controlled.

When the HSYNC signal goes low (after 40 bytes of data), the output via line 458 to address counter 432 and vertical counter 460 goes active to reset address select counter 432 back to the original address and to increment vertical counter 460.

After vertical counter 460 receives 32 inputs from line 458, vertical synchronization line (VSYNC) 462 is likewise activated. Simultaneously, the output from vertical counter 460 via line 464 to horizontal counter 446 also goes active to reset or clear horizontal counter 446 in order to ensure synchronization of the two counters 446, 460.

In the unmodified operation of the liquid crystal display as purchased, the control module addresses two rows at a time starting with rows 1 and 33. The liquid crystal display of the present invention has been modified, however, effectively disconnecting rows 33 through 64 so that only rows 1-32 are functional. Thus, the results is mask patterns having 127 columns with each column being 32 rows long. The SYNC signal after 32 counts received from horizontal counter 446 corresponds to the scan on the 32nd row.

The 40 bytes of data stored in RAM 430 continue to cycle repeatedly through register 442. At the proper point in the program of microcomputer 306, I/O line 412 again goes active to place a new set of 40 bytes of data in RAM 430 corresponding to another masking pattern.

During the time that new data is being loaded in RAM 430, register 442 continues to operate because it continues to receive clock pulses. This generates a indeterminant mask pattern during the time microcomputer 306 is writing data to RAM 430. During this time frame, the indeterminant pattern on mask 120 is inconsequential because the system is not reading detector data.

Figure 5:
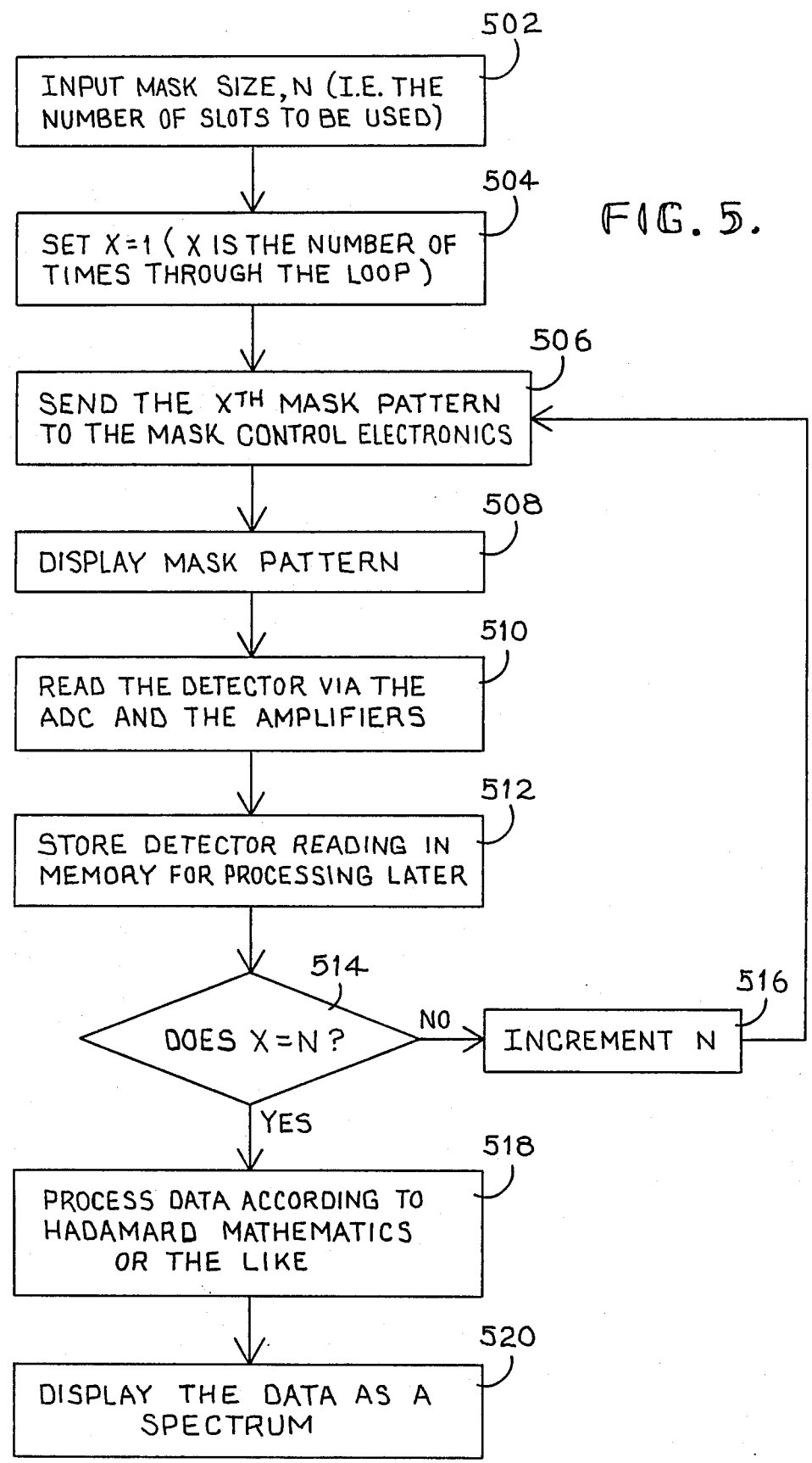
FIG. 5 is a computer program flow chart illustrating the preferred control scheme used in Raman spectrometer.

FIG. 5 illustrates a computer program flowchart for the overall operation of the computer program of microcomputer 306 used to operate spectrometer 10. The program enters at step 502 which requires the operator of microcomputer 306 to type in the number of columns (N) to be used in the various mask patterns. In the preferred embodiment illustrated herein, N=127 as discussed above.

The program then moves to step 504 to set the variable X=1 which corresponds to pattern 1 of the 127 patterns to be imposed on mask 120.

In step 506, the program sends the mask pattern to interface 304 and thus to RAM 430 during the process described above in connection with FIG. 4. The mask pattern is then displayed in step 508 when I/O line 412 is sending a read signal.

In Step 510, computer 306 reads detector data from photodiode detector 136 via current-to-voltage amplifier 310 ad 12 bit ADC 312. During step 512, data received from detector 136 is stored in memory for later processing.

The program then moves to step 514 which asks whether X=N, that is, whether all the 127 mask patterns have been displayed on mask 120. Until all 127 patterns have been iterated on mask 120, the answer in step 514 is no, the program increments variable X in step 516, and loop back to step 506.

After all 127 patterns have been imposed on mask 120, the answer in step 514 is yes and the program moves to step 518 during which the program processes the 127 sets of data stored during the passes through step 512.

The program then moves to step 520 to display the data in the desired format either in printer-plotter 308, or on a CRT screen (not shown), or the like. Preferably, the software code is written in Bordland's TurboPascal (Scotts Valley, Calif.).

Those skilled in the art will appreciate that the computer program illustrated by the flowchart of FIG. 5 can be incorporated as part of a submodule of a larger program performing other functions not the subject of the present invention.

4. Comparative Example

Figure 6:
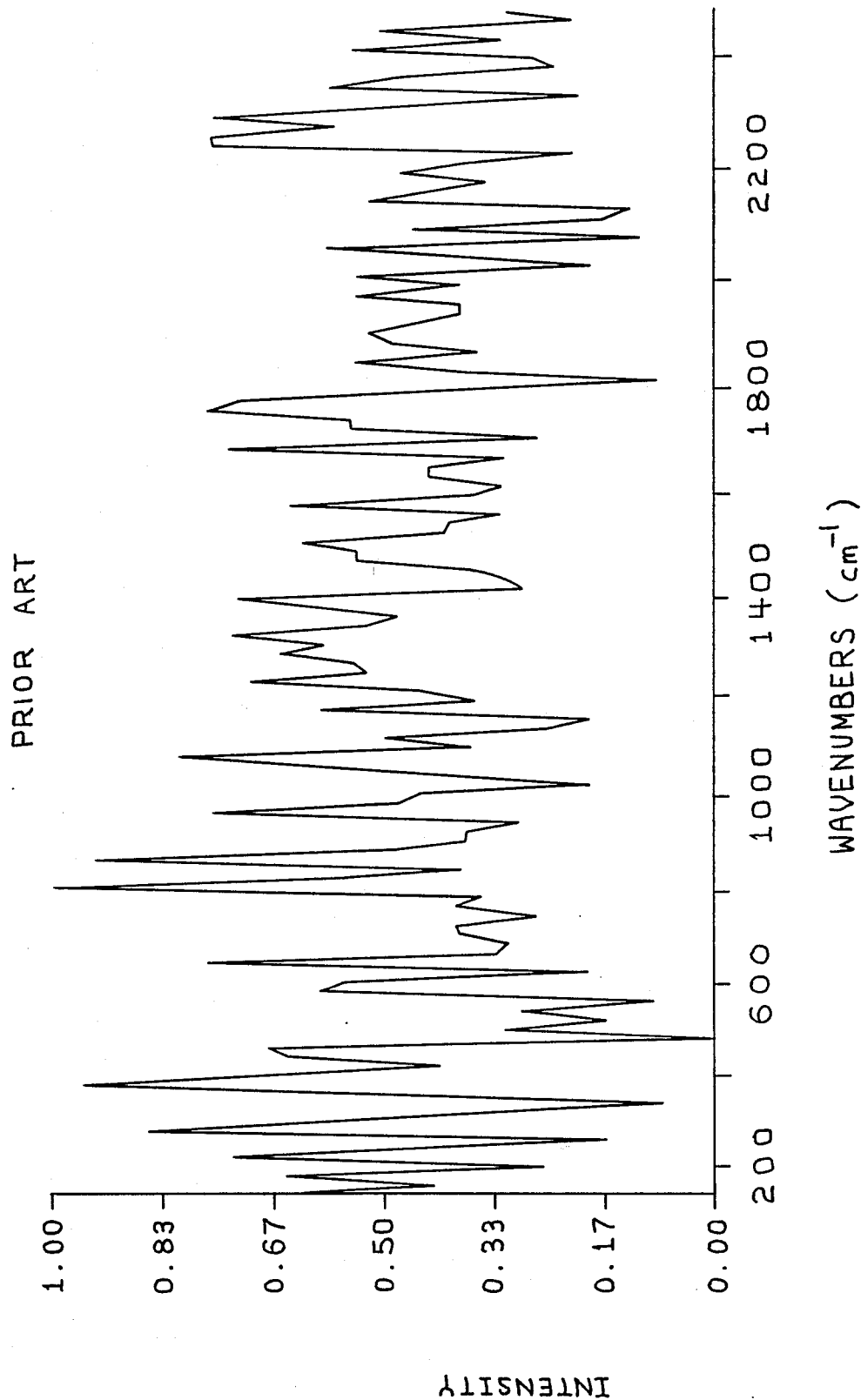
FIG. 6 is a Raman spectrum of toluene made using a conventional prior art Raman instrument.
Figure 7:
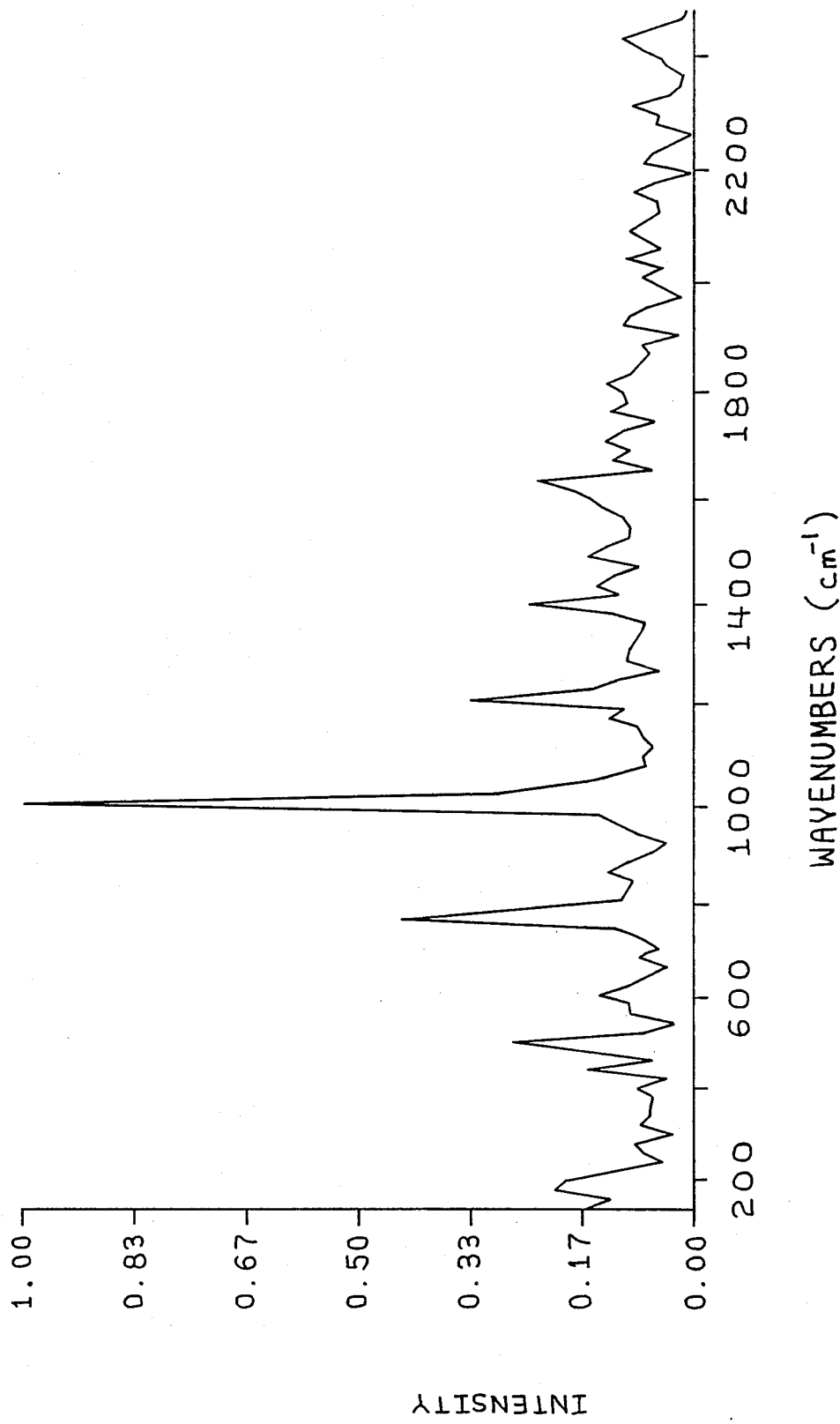
FIG. 7 is a comparative Raman spectrum of toluene made using the preferred Raman instrument of the invention.

Referring specifically to FIGS. 6 and 7, the comparative spectra of toluene is illustrated in the case of a conventional Raman slit scanning spectrometer, versus the improved spectrometer of the invention. In particular, each spectral analysis was identical and involved a sample of pure toluene at ambient temperature. A single scan was taken over a period of eleven seconds, using in this case a 514.5 nm Ar laser and a silicon diode detector. In the case of FIG. 6, the original Czerny-Turner spectrometer was employed making use of the scanning slit in lieu of a Hadamard encoding mask. As can be seen from a study of FIG. 6, the resultant spectrum was completely unusable, giving no worthwhile information. It is believed that the signal to noise ratio of the conventional instrument used in this analysis completely obliterated the desired portions of the spectrum.

On the other hand, FIG. 7 illustrates the comparative spectrum taken using the improved device of the invention, where the encoding mask is positioned to eliminate impingement of the Rayleigh lines on the operative portions of the mask. In this case, the signal to noise ratio is far more favorable, and the resulting spectrum gives the characteristic Raman shift lines for toluene.

The encoding mask in the depicted Hadamard transform Raman spectrometer allows more than one resolution element of radiation at a time to impinge upon the detector and thus provides the necessary multiplexing capability. Perhaps more important, however, is the ability of the instrument of the invention to readily eliminate the Rayleigh line from spectra. Thus, one could view the encoding mask as a variable band-pass knife-edge rejection filter permitting removal of the noisy Rayleigh line from the multiplexing window simply by electrooptically closing the resolution elements of the mask upon which the Rayleigh lines are impinging. If these resolution elements are never opened, the noise of the Rayleigh line and its intensity information is never included in the multiplexed data. Alternately, the stationary mask may be positioned in such a way that the Rayleigh line radiation never impinges upon operative portions of the mask, or the gratings of the instrument may be shifted to accomplish the same end. Thus, as shown in FIG. 1, the gratings 114, 126 may be adjusted through the medium of shaft 133 and motor 133$a$ so as to shift the Rayleigh line off the operative positions of mask 120. In either event, the deleterious effects of Rayleigh scattered radiation can be readily avoided using the spectrometer of the present invention.

While the above described comparative example has made use of a visible light monochromatic source, the invention is not so limited. It is contemplated that Raman spectroscopy in accordance with the invention can be carried out in the near-infrared spectral region, and that this should eliminate many problems associated with sample photodecomposition and fluorescence. Although the Raman radiation will be weaker in intensity in the near-infrared region, collecting a larger cone of Raman radiation, together with the multiplexing technique, will improve the signal to noise ratio, thus largely compensating for this deficiency.

In addition, various collection geometries are possible with regard to a sample under analysis. As shown in FIG. 1, the radiation emanating from the sample may be collected at a 90° angle relative to the incident radiation. Alternately, 180° back-scattering collection geometries can be employed. In the latter case, the radiation is collected by a centrally apertured parabolic mirror which focuses the radiation onto the entrance slit of the spectrometer.

We claim:

1. An apparatus for detecting Raman spectra in electromagnetic radiation emanating from a sample to be analyzed as a result of directing a beam of monochromatic light from a source thereof into the sample, the radiation including Raman and Rayleigh scattered radiation, said apparatus comprising:
   dispersing means for receiving and dispersing said radiation as dispersed radiation along a path, said dispersed radiation including Raman and Raleigh scattered radiation;
   a stationary, electro-optical device situated for impingement of at least a portion of said dispersed radiation thereon and including;
   a body presenting a pair of opposed faces,
   zone defining means carried by said body for dividing at least one of said faces into a plurality of discrete, electrically alterable zones, and
   zone altering means operably coupled with said zone defining means for selective alteration of each zone respectively between a relatively transmissive condition relative to said dispersed radiation and a relatively opaque condition relative to said dispersed radiation;
   means for preventing passage of Rayleigh scattered radiation present in said dispersed radiation through relatively transmissive ones of said zones during analysis of the sample and for allowing passage of at least a portion of said Raman scattered radiation present in said dispersed radiation through transmissive ones of said zones during analysis of the sample;
   dedispersing means for receiving and dedispersing radiation passing through transmissive ones of said zones; and
   detector means for receiving and detecting dedispersing radiation from said dedispersing means in order to detect Raman spectra thereof.

2. The spectrophotometer of claim 1, said detector being a photodiode detector.

3. The spectrophotometer of claim 1, said source being operable for generating monochromatic radiation having a wavelength of from about 0.1 to 2.0 microns.

4. The apparatus as set forth in claim 1, further including a laser as said source of said monochromatic light beam and means for detecting said beam into the sample.

5. The apparatus as set forth in claim 1, said masking device including a liquid crystal masking device.

6. The apparatus as set forth in claim 1, said zone altering means including;
   means for successively and sequentially changing over time in a predetermined fashion the patterns of said zones altered relatively transmissive and opaque during analysis of the sample, and
   means operably connected with said detector means for successively receiving and analyzing detected radiation information from said detector means during each of said patterns in order to provide a spectral analysis.

7. The apparatus as set forth in claim 1, said preventing means including means for selectively adjusting said path of said dispersed radiation in order to prevent impingement of said Rayleigh scattered radiation on transmissive ones of said zones.

8. The apparatus as set forth in claim 1, said Rayleigh scattered radiation present in said dispersed radiation impinging on certain ones of said zones, said preventing means including means for altering said certain ones of said zones to said relatively opaque condition thereby preventing passage of said Rayleigh scattered radiation through relatively transmissive ones of said zones.

9. The apparatus as set forth in claim 1, said zone altering means including a microcomputer.

10. The apparatus as set forth in claim 1, said detector means including a photodiode.

11. In a method of detecting Raman spectra including the steps of directing a beam of monochromatic light into a sample to be analyzed, and collecting electromagnetic radiation emanating from the sample as a result of the beam, the radiation including Raman and Rayleigh scattered radiation, the improvement which comprises the steps of:
    dispersing the radiation emanating from the sample as dispersed radiation along a path, said dispersed radiation including Raman and Rayleigh scattered radiation;
    providing and positioning a stationary electro-optical masking device for impingement of at least a portion of said dispersed radiation thereof wherein said masking device includes;
    a body presenting a pair of opposed faces,
    zone-defining means carried by said body for dividing at least one of said faces into a plurality of discrete, electrically alterable zones, and
    zone-altering means operably coupled with said zone-defining means for selective alteration of each zone respectively between a relatively transmissive condition relative to said dispersed radiation and a relatively opaque condition relative to said dispersed radiation;
    preventing passage of Rayleigh scattered radiation present in said dispersed radiation through relatively transmissive ones of said zones during analysis of the sample and allowing passage of at least a portion of said Raman scattered radiation present in said dispersed radiation through relatively transmissive ones of said zones during analysis of the sample;
    dedispersing radiation passing through relatively transmissive ones of said zones by use of a dedispersing device; and
    detecting the dedispersed radiation from said dedispersing device in order to detect Raman spectra thereof.

12. The improvement as set forth in claim 11 further including the step of providing a laser as the source of the beam of monochromatic radiation and directing the beam into the sample.

13. The improvement as set forth in claim 11, further including the step of detecting the dedispersed radiation with a photodiode.

14. The improvement as set forth in claim 11, said monochromatic radiation having a wavelength of from about 0.1 to 2.0 microns.

15. The improvement as set forth in claim 11, said masking device including a liquid crystal masking device.

16. The improvement as set forth in claim 11, further including the steps of:
  successively and sequentially changing over time in a predetermined fashion the patterns of said zones altered relatively transmissive and opaque during analysis of the sample, and
  successively receiving and analyzing detected radiation information from said detector means during each of said patterns in order to provide a spectral analysis.

17. The improvement as set forth in claim 11, said preventing step including the step of selectively adjusting said path of said dispersed radiation in order to prevent impingement of said Rayleigh scattered radiation on transmissive ones of said zones.

18. The improvement as set forth in claim 11, said Rayleigh scattered radiation present in said dispersed radiation impinging on certain ones of said zones, said preventing step including the step of altering said certain ones of said zones to said relatively opaque condition thereby preventing passage of said Rayleigh scattered radiation through relatively transmissive ones of said zones.

19. The improvement as set forth in claim 11, said zone altering means including a microcomputer.

* * * * *